Sept. 25, 1923.                                                         1,468,899
E. A. R. CHENARD
FRACTIONAL DISTILLING APPARATUS
Filed March 24, 1921          2 Sheets-Sheet 1
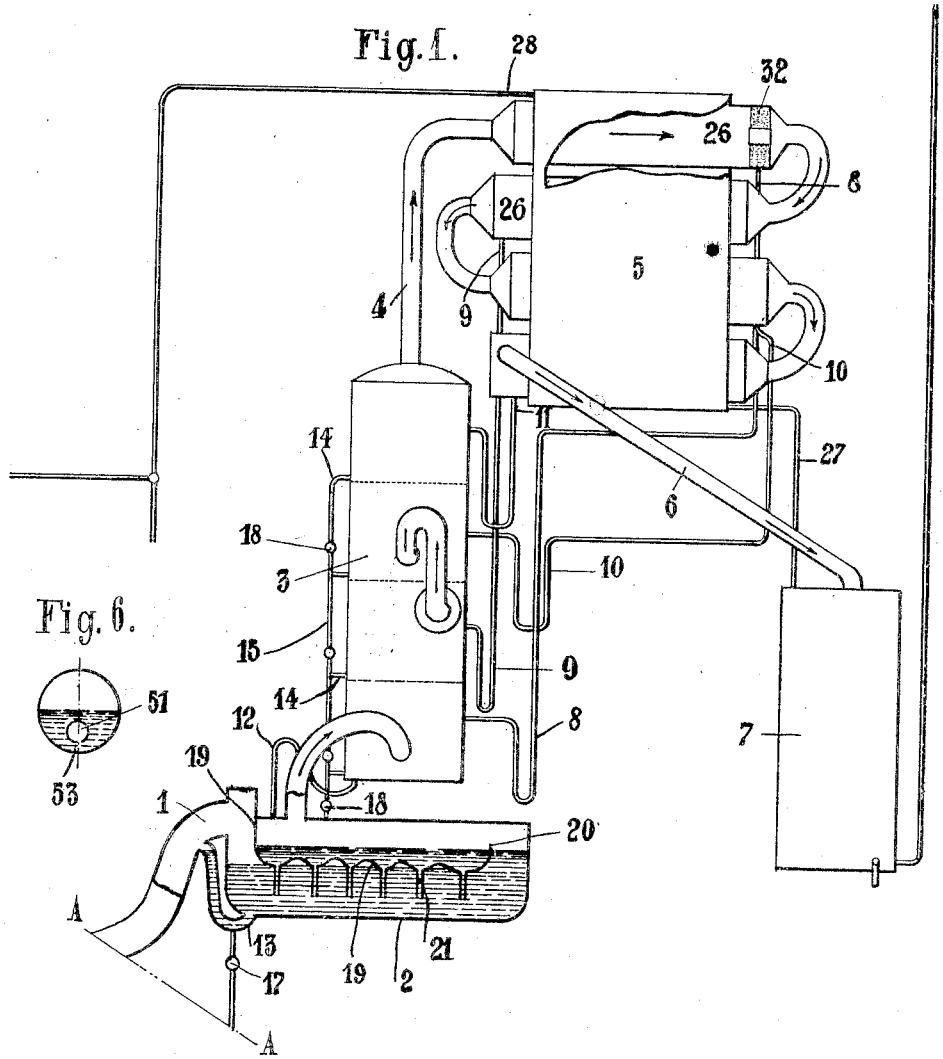
INVENTOR
Emile André Raymond Chenard
BY
ATTORNEY

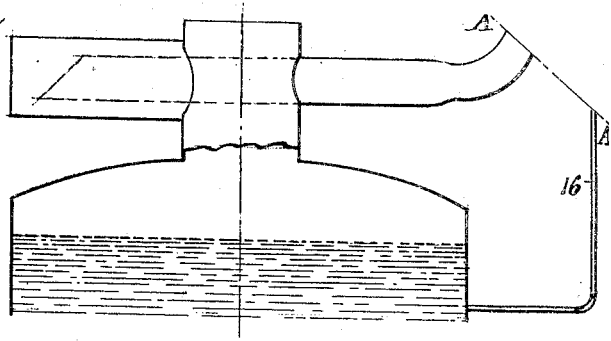
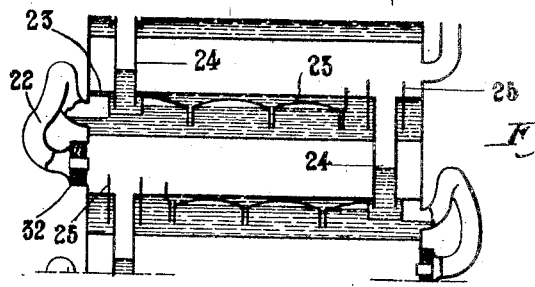
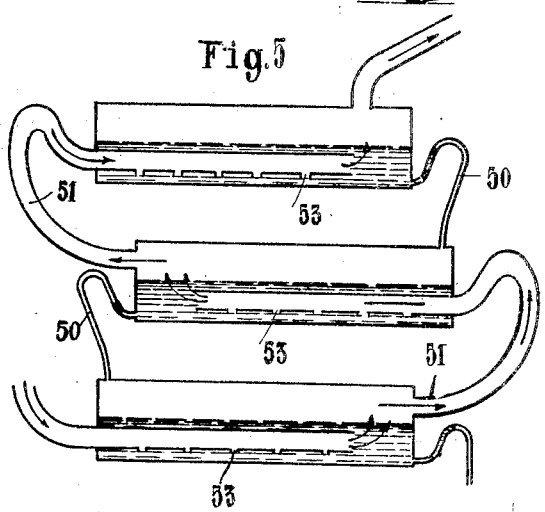
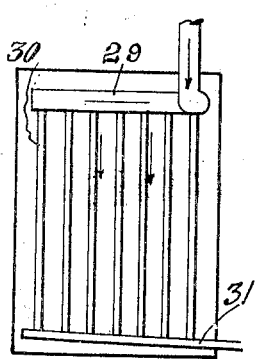
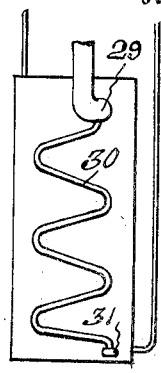

Patented Sept. 25, 1923.

1,468,899

UNITED STATES PATENT OFFICE.

EMILE ANDRÉ RAYMOND CHENARD, DECEASED, OF BORDEAUX, FRANCE; BY JEAN ARMAND CHENARD, EXECUTOR, OF BORDEAUX, FRANCE.

FRACTIONAL DISTILLING APPARATUS.

Application filed March 24, 1921. Serial No. 455,071.

*To all whom it may concern:*

Be it known that EMILE ANDRÉ RAYMOND CHENARD, late a citizen of the Republic of France, and resident of Bordeaux, France, deceased, did invent a new and useful Fractional Distilling Apparatus (for which he filed an application in France on January 3, 1921), of which the following is a specification.

In my prior patent, granted February 21, 1922, No. 1,407,380, there is described a fractional distilling apparatus comprising condensing units, provided with wire gauze filters or screens and with inverted siphons for returning the condensates; such units forming heat exchanging elements through which the condensates and the vapors rising from the boiler travel in opposite directions.

The present invention has for its object the application of this new method of operation to the ordinary processes of fractional distillation and, in general, to thermal or molecular exchanges, or both at once, between liquids and either vapors or gases.

In order to render the following explanations as clear as possible, the accompanying drawing shows, by way of example, the application, to an ordinary fractional distilling apparatus, of the specific features above described.

Figure 1 together with Figure 1ª is a diagrammatic view, partly in section and partly in elevation, of the improved apparatus.

Fig. 2 is a fragmental section showing the trays or compartments of the column.

Figs. 3 and 4 are vertical sections taken at right angles to each other through the cooler.

Fig. 5 is a fragmental vertical section showing a modification of the arrangement of the trays or compartments.

Fig. 6 is a transverse section through one of the compartments.

The apparatus comprises, according to the order of circulation of the vapors, a boiler provided with a heat exchange device of the character described in the above-identified patent, which conducts the vapors at 1 into a purifier 2, thence into a column 3, and through the pipe 4 into a condenser 5, whence they escape by the pipe 6 into the cooler 7.

The liquids resulting from the progressive condensation in the condenser are systematically returned in the opposite direction by the pipes 8, 9, 10, 11 to the successive compartments of the column, so as to lead the first condenstate, which has the lowest alcoholic content, to the bottom of the column, and so on; the top compartment of the column receiving, from the pipe 11, the condensates having the highest alcoholic content and which come from the last unit of the condenser.

In normal operation, the liquids flow down, as usual, from tray to tray in the interior of the column and pass through a pipe 12 into the purifier 2, in the upper compartment of which they collect. They then pass through the depending spouts 21 into the lower compartment, and from the latter they pass through the inverted siphon 13 into the exchanger and the boiler. A draw-off pipe 14 is provided at the bottom of each tray or compartment of the column to discharge the liquid therefrom into a collector 15 common to all of said pipes, whence it flows into the purifier 2, from which latter the entire body of liquid can be emptied through a conduit 16 provided with a valve 17 into the boiler. Valves 18 interposed in the connections between the compartments of the column and the collector 15 enable the discharge from any one or more of the compartments to be regulated at will.

At the beginning of each operation, the valves 18 are open, and afterwards closed successively so as to store up the liquid first in the purifier 2, then in the lowest compartment of the column, and then in the next lowest and so on. Thus, from the very start, the fractionation of the liquids in the order of their concentration can be effected.

The purifier 2 may be defined as a plate or tray of very large size located between the boiler and column, when used in a discontinuous still, in which event it must have a capacity of from 5% to 20% of that of the column. Its function is to interpose in the circulation a body of liquid sufficiently large and of sufficient concentration to permit the tailings rising from the lower part of the apparatus to constantly become very highly diluted. If this dilution is sufficient, the vapors given off will contain only a negligible proportion of these tailings. In the case of substances of a certain character undergoing treatment, this condition may not be readily fulfilled by the ordinary working of the apparatus. It is then advisable to overcome this by carefully introducing washing liquid from some external source of supply. The working of the upper portion of the apparatus is correspondingly simplified, and the final purification becomes more efficient.

The function of the purifier having thus been set forth, its construction will now be described. It consists of a closed receptacle or box, to the upper part of which the vapors are supplied at 1. A very thin, metal partition 19, having a vertical part at one end, is disposed within this box, the horizontal body part of said partition being formed with undulations several centimeters high and terminating at its free end in a vertical rim 20 which extends above the outlet level of the siphon 13. Excepting at the part 20, where a large empty space is left between it and the adjacent vertical wall of the box, the partition 19 thus forms a shallow reservoir suspended in the interior of the box or case 2. The spouts 21 extending downward from the bottom of each undulation insure the vertical circulation of the liquid between the upper and lower chambers thus produced in the interior of the purifier.

This construction compels the vapors to force the liquid in the purifier backward and downward in order to reach the successive undulations, which latter cause them to spread out along the entire surface; and they can escape only through the empty space between the rim 20 and the wall of the purifier. The vapors thus remain in prolonged contact over a very large surface with the partition 19 and the liquid thereunder; and under these conditions the maximum useful effect is obtained when the vapors led into a chamber are entirely condensed and the resulting heat entirely utilized to reheat the liquid, thus liberating fresh vapors of a higher degree of concentration.

On the other hand, the liquids flowing down from the column are caused to spread out over the surface of the liquid already present in the upper chamber of the purifier above the partition 19. They can reach the lower chamber and become mixed only after having been subjected, through partition 19, to the heating action of the vapors spreading out underneath, thus giving off rich vapors which pass into the column. In this way, there is set up in the very interior of the purifier a vertical circulation of the liquids, resulting in a new and important fractionation of liquid and vapors.

The plates or trays of the column (Fig. 2) are constructed on the same principle. In each compartment or chamber, the vapors conducted thereinto from the next lower compartment by a pipe 22, which latter they enter after having passed through a filter 32, are discharged beneath an undulating metal partition 23 which causes them to spread out and heat the entire surface of said partition together with the liquid which it receives from the next higher compartment through the overflow pipe 24. The vertical circulation of the liquid is insured by the depending spouts secured to the bottom of each undulation and by an open-ended tube 25 encircling the overflow pipe. The upper edge of said tube projects some distance above the level of the liquid, and the latter obtains access to the overflow pipe only through the space at the bottom between the overflow pipe and the wall of the tube.

In certain cases, and especially for various installations on a small scale, the principle designed for the circulation of the vapors and liquids through the compartments may give place to a simplified arrangement. Each compartment, in such instance, comprises a cylinder disposed with its axis horizontal and filled with liquid for half its height, this level being controlled by the down-pipes 50 which are arranged in the manner represented in Figs. 5 and 6. At the upper part of each compartment, the vapors escape into a pipe 51 having a prolongation which extends horizontally into the next higher compartment where it is completely submerged in the liquid. The uncondensed vapors discharged at its extremity bubble into the liquid and thus reach a state of equilibrium with the surrounding liquid, as regards both temperature and composition, before breaking up.

The portion of each of the pipes 51 lying within the corresponding compartment has formed along the median line of its bottom a series of perforations 53 which facilitate the changes in the level of the liquid within the pipe, or, on the other hand, the expulsion and bubbling out of the vapors according to the variations which the vapor pressure may occasionally undergo.

The condenser comprises a series of cylindrical bodies 26 of large volume, and disposed horizontally in superposed relation within a tank 5, of which they occupy the greatest portion of the interior space. The vapors are delivered to the uppermost cylinder and circulate systematically therefrom to the next lower cylinder, and so on, after having accomplished some mechanical work in each cylinder against the external pressure, with the result that they undergo a progressive cooling. This action is completed by the gradual re-heating of the liquid coming from the cooler which is delivered by the pipe 27 to the bottom of the condenser, and which leaves the condenser through the pipe 28 leading from the top thereof, after having circulated around the cylinders. From pipe 28 the liquid can be delivered to a drain or to an alcohol or wine tank where the heat which it has absorbed from the vapors will be recovered by surface exchange.

The cooler 7 comprises a tank (Figs. 3 and 4) in the upper part of which the vapor pipe 29 enters and terminates horizontally; and from said horizontal portion, a plurality of worms 30 extend parallelly downward to receive the vapors and conduct them, after condensation and cooling, into a collecting pipe 31 which discharges them outside.

This arrangement has the advantage of enabling the use, in their whole length, of the ordinary commercial tubes; and for the same refrigerating surface, it permits a simpler construction than the usual tubular coolers or condensers.

Finally, it is very important to provide, at the vapor outlets, filter boxes or vapor wipers in each compartment to catch and collect the liquid particles entrained in the vapors, which particles would impede the purification and concentration of the alcohol. Fig. 2 shows one of these devices 32 placed at the vapor outlet of one column compartment, and Fig. 1 shows one of them at the outlet end of one of the condenser units. The filter consists of a strip of wire gauze rolled in a tight spiral around a spindle formed by a closed tube, and forced into the cylindrical space designed to receive it.

The same arrangement may be applied without any substantial change to a great many other uses: 1st, by reason of the well known property of wire gauze of instantly reaching a state of thermic equilibrium with the fluids crossing it; 2nd, by reason of the state of fine subdivision imposed upon the fluids. It is apparent that if a chemical reaction is sought between a current of liquid and a current of gas circulating in opposite directions through the gauze, the fine subdivision to which both the gas and the liquid are subjected at the same time and the multiplication of the contact surfaces will facilitate the molecular exchange to the highest degree.

The following may be cited as examples:

The employment of the apparatus to heat and humidify dry, cold air, the latter passing through the wire gauze in the same way as indicated in the drawing, while the gauze is sprinkled with hot water.

The employment of the same apparatus to purify a gas charged, for example, with ammoniacal vapors, by sprinkling cold water which will be collected at the bottom of the apparatus in the form of ammonia solution, while the purified gas will escape at the top of the apparatus.

The employment of the apparatus for the concentration of a hot alcoholic solution, said solution being used to sprinkle the wire gauze, while a current of steam is led therebeneath. The steam condenses and effects the vaporization of the alcohol.

In a general way, the employment of the same apparatus for effecting thermal or molecular exchanges, or both, between liquids and vapors or gases.

I claim as my invention:—

1. The combination, with a plate column and a boiler, of a series of condensing units; siphons for returning the condensates obtained on the plates of the column; a purifier for the condensates; a heat exchange device through which the vapors from the boiler and the condensates circulate in opposite directions; and a cooler for condensing the vapors after they have left the last condensing unit of the series.

2. The combination, with a plate column and a boiler, of a series of condensing units each provided internally with a filter composed of tightly-rolled wire gauze arranged in the path of the vapors passing therethrough; siphons for returning the condensates obtained on the plates of the column; a purifier for the condensates; a heat exchange device through which the vapors from the boiler and the condensates circulate in opposite directions; and a cooler for condensing the vapors after they have left the last condensing unit of the series.

3. The combination, with a plate column and a boiler, of a series of condensing units; siphons for returning the condensates obtained on the plates of the column, the condensates least rich in alcohol being returned to the base of the column; an undulating metal partition in each of the compartments defined in the column between adjacent plates thereof; a vapor supply pipe leading from the upper portion of each compartment to the lower portion of the next higher compartment beneath the partition in the latter compartment; a liquid supply pipe leading from each compartment to the next lower compartment above the partition therein; a plurality of depending spouts secured to the under side of each partition to provide communication between the spaces above and below the partition; a heat exchange device through which the vapors from the boiler and the condensates circulate in opposite directions; and a cooler for condensing the vapors after they have left the last condensing unit of the series.

4. The combination, with a plate column and a boiler, of a series of condensing units; siphons for returning the condensates obtained on the plates of the column; a tank for purifying the tailings; an undulating partition in said tank connected at one side with the top of the tank and having at its other side an upstanding flange which is spaced from the adjacent wall of the tank;

a plurality of depending spouts secured to the under side of each partition to provide for the vertical circulation of the liquid between the spaces above and below the partition; a vapor supply pipe leading from the boiler into the space below the partition; a vapor discharge pipe above the sheet of liquid on the partition; and a heat exchange device through which the vapors coming from the boiler and the condensed liquid circulate in opposite directions.

5. The combination, with a plate column and a boiler, of a series of condensing units; siphons for returning the condensates obtained on the plates of the column; a series of pairs of cylindrical bodies extending into one another, the vapors coming from the boiler passing through the outer cylindrical bodies in one direction and through the inner cylindrical bodies in the opposite direction, while the condensates circulate in the reverse direction; a cooler to which the vapors are finally delivered; an upper tube in said cooler to receive the in-coming vapors; a series of parallel worms in said cooler connected at their upper ends to said tube; and a discharge tube having a portion located in the bottom of the cooler and to which the lower ends of the worms are connected.

6. The combination with a plate column and a boiler; of a series of condensing units connected with the column to receive the vapors discharged therefrom; and a cooler to which the vapors are discharged from the last condensing unit of the series, comprising a tank, an upper tube therein to receive the in-coming vapors, a series of parallel worms in said tank connected at their upper ends to said tube, and a discharge tube having a portion located in the bottom of the tank and to which the lower ends of the worms are connected.

In testimony whereof I affix my signature.

JEAN ARMAND CHENARD,
*Executor of Emile André Raymond Chenard, deceased.*

Witnesses:
  JAMES D. CHILD, [L. S.]
  TILY GURBAUD. [L. S.]